(12) United States Patent
Gerstel

(10) Patent No.: US 11,374,907 B2
(45) Date of Patent: Jun. 28, 2022

(54) HIGHLY AVAILABLE SOFTWARE DEFINED WIDE AREA NETWORK

(71) Applicant: SEDONASYS SYSTEMS LTD, Ramat Gan (IL)

(72) Inventor: Ori Gerstel, Tel Aviv (IL)

(73) Assignee: SEDONASYS SYSTEMS LTD, Raanana (IL)

(*) Notice: Subject to any disclaimer, the term of this patent is extended or adjusted under 35 U.S.C. 154(b) by 0 days.

(21) Appl. No.: 17/004,044

(22) Filed: Aug. 27, 2020

(65) Prior Publication Data
US 2022/0070146 A1 Mar. 3, 2022

(51) Int. Cl.
| | |
|---|---|
| G06F 15/16 | (2006.01) |
| H04L 9/40 | (2022.01) |
| H04L 43/12 | (2022.01) |
| H04L 45/586 | (2022.01) |
| H04L 12/46 | (2006.01) |

(52) U.S. Cl.
CPC ...... *H04L 63/0272* (2013.01); *H04L 12/4633* (2013.01); *H04L 43/12* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 6,813,644 B1* | 11/2004 | Jamieson | H04L 12/4675 709/242 |
| 7,188,189 B2* | 3/2007 | Karol | H04L 63/0227 370/351 |
| 9,294,323 B2 | 3/2016 | Zhang | |
| 2005/0220107 A1* | 10/2005 | DelRegno | H04L 12/4633 370/392 |
| 2006/0198368 A1* | 9/2006 | Guichard | H04L 63/0272 370/389 |
| 2008/0123651 A1 | 5/2008 | Vasseur et al. | |
| 2010/0142410 A1* | 6/2010 | Huynh Van | H04L 12/4641 370/255 |
| 2014/0198794 A1 | 7/2014 | Mehta et al. | |
| 2020/0296029 A1* | 9/2020 | Shenoy | H04L 41/12 |

FOREIGN PATENT DOCUMENTS

EP    3116171 A1    1/2017

OTHER PUBLICATIONS

The International Search Report and Written Opinion for PCT Application No. PCT/IL21/050986, dated Dec. 9, 2021.

* cited by examiner

*Primary Examiner* — Anh Nguyen
(74) *Attorney, Agent, or Firm* — Lee & Hayes, P.C.

(57) ABSTRACT

A system for connecting sites of an enterprise organization over a wide area network, including: customer premises equipment (CPE) at sites of the enterprise organization; wherein the CPE are configured to communicate using at least two VPNs over a wide area network (WAN) with other CPEs of the enterprise organization; wherein each CPE is connected by a service provider edge router to the WAN; and wherein each VPN defines a tunnel for routing traffic in the IP layer between the service provider edge routers of any two CPEs.

20 Claims, 3 Drawing Sheets

HIGHLY AVAILABLE SOFTWARE DEFINED WIDE AREA NETWORK

TECHNICAL FIELD

The present disclosure relates generally to software defined networks for connecting together remote enterprise offices and more specifically to software defined networks that can overcome communication failures.

BACKGROUND

A software defined wide area network (SD-WAN) is a technology for connecting enterprise offices over the network without the help of service providers (SPs). The SD-WAN uses customer premise equipment (CPE) that is installed in the different offices of the enterprise. The CPE is connected to the internal office network on one hand and to an external network (a WAN e.g. the Internet) connecting the offices on the other hand. The CPE automatically establishes secure connectivity with other CPE devices of the enterprise over the external network enabling workstations and other equipment in different offices to communicate over a private network.

Moreover, the CPE can connect to multiple networks and automatically decide which traffic goes over which network, based on the quality of each network and enterprise specific policies (e.g., sensitive traffic does not go over the Internet but over a mobile network). Customers can use SD-WAN technology to communicate privately over cheaper public networks instead of leasing more expensive VPNs from the SPs.

SPs are trying to reduce customer loss from SD-WAN by offering their own SD-WAN service, using the same CPEs. They add value by defining one of the networks that the CPE devices connect to as a high-quality and secure virtual private network (VPN) that is typically shared between the SD-WAN users. The VPN is generally used for the more important and sensitive traffic of the enterprise, while other traffic uses the Internet. However in case of a failure in the SP network that affects the shared VPN, the important traffic using it is disconnected until the IP layer recovers the shared VPN.

SD-WAN technology is meant for small/medium enterprises that are not willing to pay high costs for their own dedicated VPN that carries all their traffic and are less strict about service quality and security. High-end customers typically stick to the traditional SP provided VPN service that is dedicated for them (without SD-WAN CPEs).

SUMMARY

An aspect of an embodiment of the disclosure, relates to an enterprise organization with remote sites connected over a software defined wide area network (SD-WAN). Each site installs a customer premise equipment (CPE) that uses two or more VPNs to automatically define a resilient network connecting together the CPEs at each site of the enterprise organization. The traffic between CPEs in each VPN is carried by a set of tunnels. In an exemplary embodiment of the disclosure, the physical path between any two service provider edge routers (PE) along tunnels of respective VPNs are diverse so that if in a path between a source CPE to a destination CPE in one VPN fails, the path between the same two CPEs in another VPN will not be affected. Optionally, the source CPE quickly changes the VPN used for transmitting data to the destination CPE should the current VPN fail along the path to the destination.

There is thus provided according to an exemplary embodiment of the disclosure, a system for connecting sites of an enterprise organization over a wide area network, comprising:

Customer premises equipment (CPE) at sites of the enterprise organization;

Wherein the CPE are configured to communicate using at least two VPNs over a wide area network (WAN) with other CPEs of the enterprise organization;

Wherein each CPE is connected by a service provider edge router to the WAN; and

Wherein each VPN defines a tunnel for routing traffic in the IP layer between the service provider edge routers of any two CPEs.

In an exemplary embodiment of the disclosure, the tunnels are defined such that a physical path between the service provider edge routers in the at least two VPNs are diverse from each other. Optionally, a central controller instructs the service provider edge routers to form diverse paths.

In an exemplary embodiment of the disclosure, each service provider edge router is preconfigured to form diverse paths for any two tunnels terminated at both ends by the same service provider edge routers. Optionally, each service provider edge router defines loopback addresses for each VPN and creates a tunnel between respective loopback addresses of pairs of service provider edge routers. In an exemplary embodiment of the disclosure, each service provider edge router defines a virtual router for each VPN, and binds each virtual router with a respective loopback address. Optionally, the CPEs are configured to monitor a status of connectivity to other CPEs and select a VPN for transmission of traffic responsive to the status of connectivity.

In an exemplary embodiment of the disclosure, the CPEs inject probe packets into the tunnels of the VPNs to determine the status of connectivity. Optionally, the CPEs select a VPN for the transmission of traffic based on a response to the injected probe packets. In an exemplary embodiment of the disclosure, the CPEs select a VPN for transmission of traffic based on injected packets from other CPEs.

There is further provided according to an exemplary embodiment of the disclosure, a method of connecting sites of an enterprise organization over a wide area network, comprising:

Installing customer premises equipment (CPE) at sites of the enterprise organization;

Configuring the CPE to communicate using at least two VPNs over a wide area network (WAN) with other CPEs of the enterprise organization;

Connecting each CPE to the WAN by a service provider edge router;

Wherein each VPN defines a tunnel for routing traffic in the IP layer between the service provider edge routers of any two CPEs.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

Figure 1:
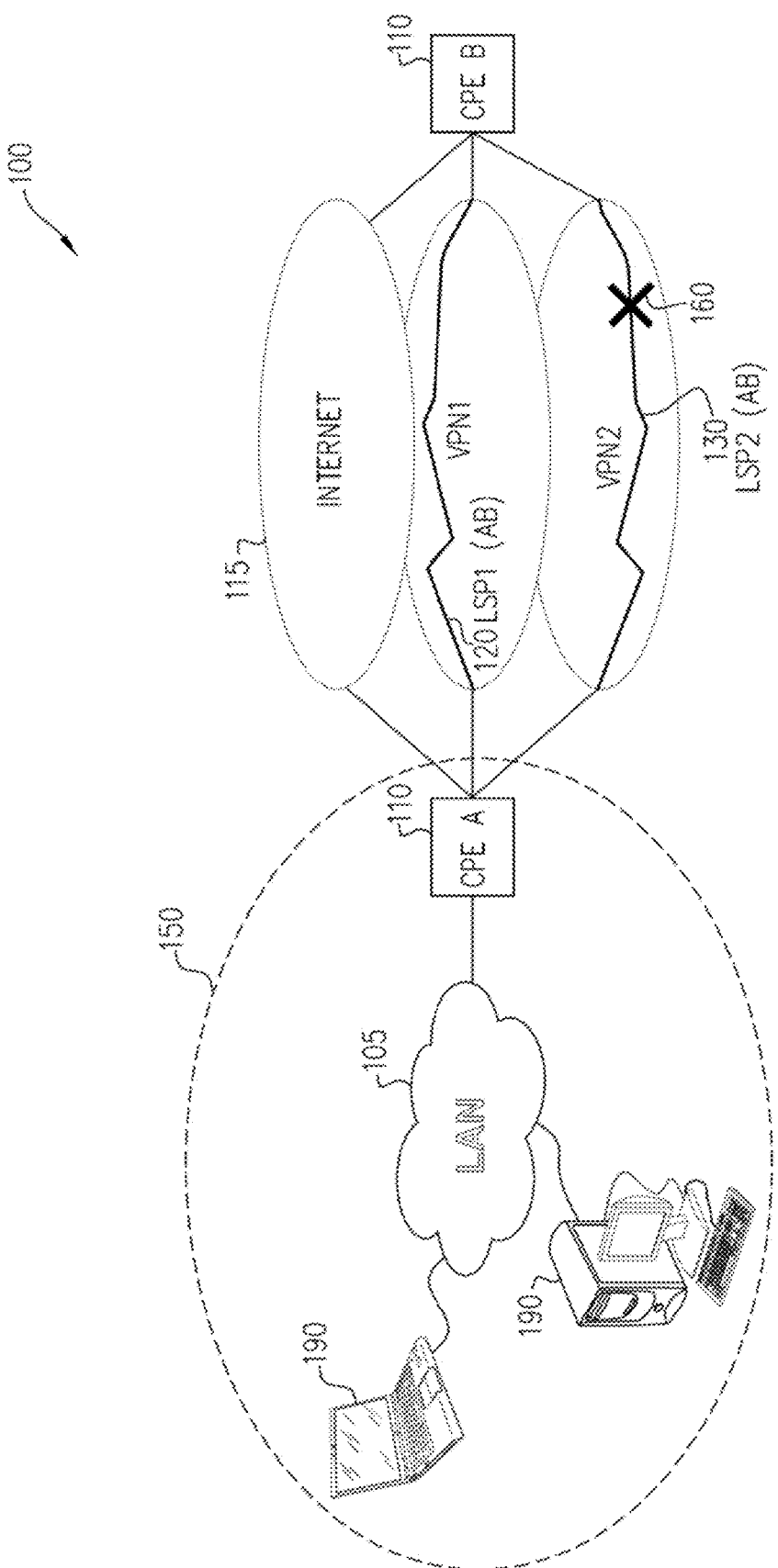
FIG. 1 is a schematic illustration of an exemplary configuration of an SD-WAN network connecting offices of an enterprise organization, according to an exemplary embodiment of the disclosure.

FIG. 1 is a schematic illustration of an exemplary configuration of an SD-WAN network 100 connecting offices of an enterprise organization, according to an exemplary embodiment of the disclosure. In an exemplary embodiment of the disclosure, the enterprise organization includes a plurality of sites 150 with one or more workstations 190 participating as members of the enterprise network. In this disclosure workstations 190 also include servers and storage stations or other end equipment. Optionally, the workstations 190 are connected together over a local area network (LAN) 105. In an exemplary embodiment of the disclosure, local area network 105 at each site 150 is connected to a customer premises equipment (CPE) 110 to automatically connect together the sites 150 of the enterprise organization over a wide area network (WAN) in a pseudo-private network. Optionally, each CPE 110 is able to communicate with all other CPEs 110 of the enterprise organization.

In an exemplary embodiment of the disclosure, the CPEs 110 are connected together over a wide area network (WAN) (e.g. the Internet 115) by at least two virtual private networks (VPN1 125 and VPN2 135). The CPEs 110 may also be connected together over the Internet 115 or other wide area networks. Optionally, the CPE 110 is configured to monitor the status of connectivity to each remote CPE 110 over each WAN and select transmission of traffic over the various WANs based on various characteristics, such as security, transmission quality or predesignated instructions provided in packets of the traffic. The transmission quality may include monitoring packet loss, delay and jitter (variability of the delay). The use of two VPNs enhances performance and improves service availability since the CPE 110 can improve throughput or avoid packet loss by selecting a better path (e.g. selecting which VPN to use).

In an exemplary embodiment of the disclosure, CPE 110 may inject probe packets into both VPNs from one CPE 110 to every other CPE 110 (at different locations) to determine the status of connectivity. Optionally, the probe packets include a serial number and a timestamp to enable measuring packet loss and transmission delay. In an exemplary embodiment of the disclosure, a remote CPE 110 provides feedback in response to the injected probes. Optionally, CPE 110 can select a specific VPN for transmitting packets based on the information received in response to the injected probe packets. In some embodiments of the disclosure, CPE 110 can select a VPN for transmitting packets based on serial numbers and timestamps of probe packets received from other CPEs.

In an exemplary embodiment of the disclosure, a set of tunnels is defined for each VPN for routing traffic in the IP layer. Optionally, the tunnels may be label switch paths (LSP) as described in the examples below. Alternatively, the tunnels may be based on multi-protocol label switching (MPLS) technology or segment routing (SR) technology.

In VPN1 125 a path LSP1 (AB, AC, BC) 120 is defined between every pair of CPEs 110 in the enterprise network and in VPN2 135 a path LSP2 (AB, AC, BC) 130 is defined between every pair of CPEs 110. Optionally, the LSPs are defined such that the physical path between any two service provider edge routers (PE) (e.g. see FIG. 2) connected to the CPE 110s are diverse from each other (e.g. don't share nodes or links). Thus if any specific physical link malfunctions it will only affect one of the two VPNs (VPN1 125, VPN2 135). The two VPNs (VPN1 125, VPN2 135) therefore guarantee communications under any single physical link failure 160 or congestion event on a specific physical link.

SD-WAN network 100 provides better availability than an SD-WAN network in which the CPEs are using a single VPN or two VPNs which are not guaranteed to use diverse paths, since a single failure may affect the traffic between a pair of CPEs on both VPNs.

In an exemplary embodiment of the disclosure, the Internet 115 serves as a fallback network for the two VPNs. CPE 110 may prevent sensitive traffic from being transmitted over the Internet 115 unless both VPNs (125, 135) fail. Optionally, an administrator can pre-select if to allow transmissions over the Internet in case of failure of the VPNs or select when a failure occurs. In some embodiments of the disclosure, CPE 110 probes the various existing paths (115, 125 and 135) to select a transmission path based on quality, security or other considerations.

Figure 2:
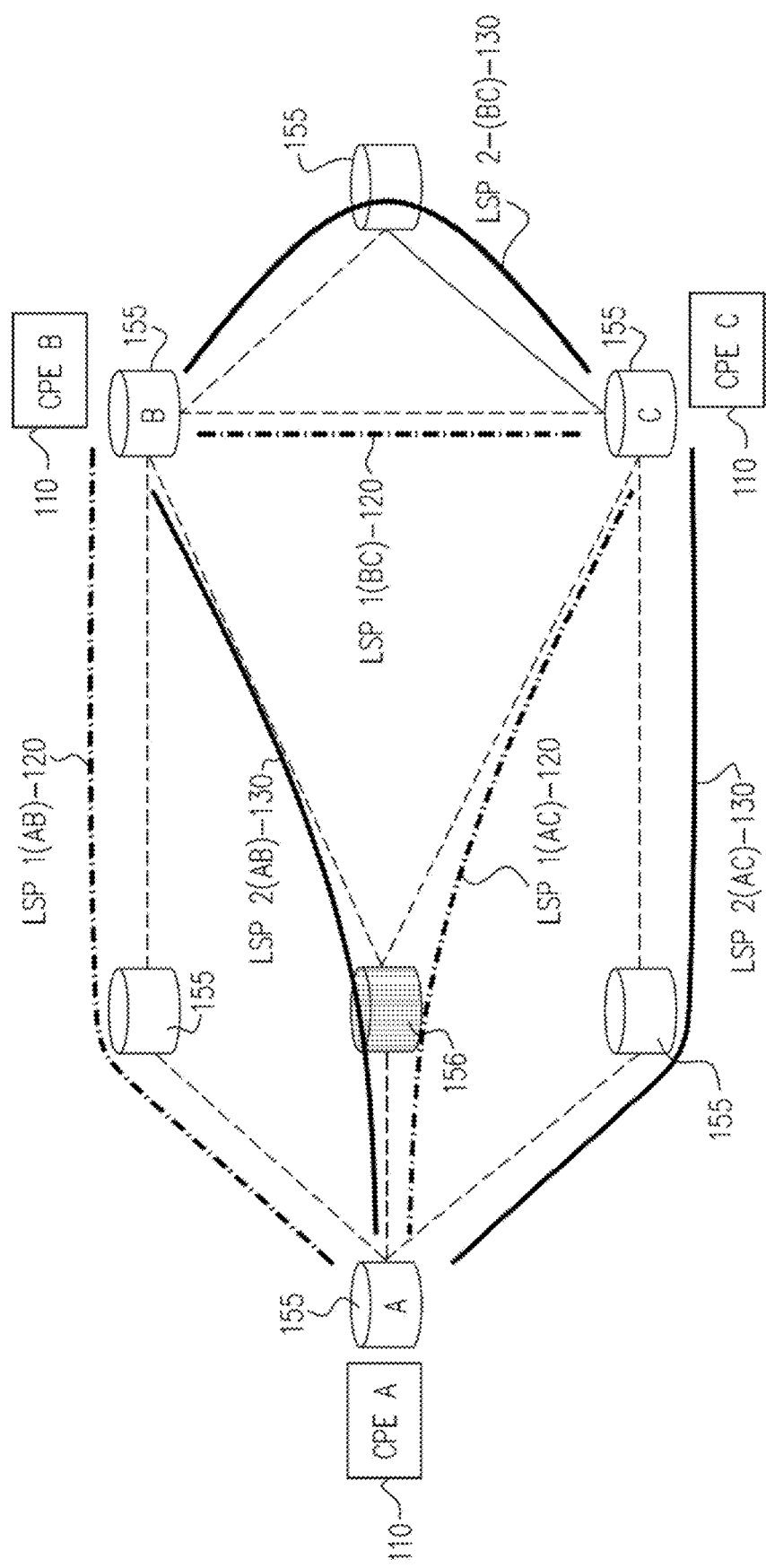
FIG. 2 is a schematic illustration of diverse paths provided by two VPNs, according to an exemplary embodiment of the disclosure.

FIG. 2 is a schematic illustration of diverse paths provided by two VPNs (VPN1 125, VPN2 135), according to an exemplary embodiment of the disclosure. In an exemplary embodiment of the disclosure, both VPN1 and VPN2 connect between CPEs 110 at sites A, B and C using various communication lines and service provider edge routers 155, 156. However the paths used by the VPNs (LSP1 120, LSP2 130) between any two sites (A, B, C) are diverse. If for example router 156 or a communication line passing through router 156 fails or is congested, then LSP2 (AB) between A and B will fail. However LSP1 (AB) between A and B will not fail. Likewise LSP1 (AC) between A and C will fail, but LSP2 (AC) between A and C will not fail. Additionally, LSP1 (BC) and LSP2 (BC) between B and C will not be affected by the failure.

Figure 3:
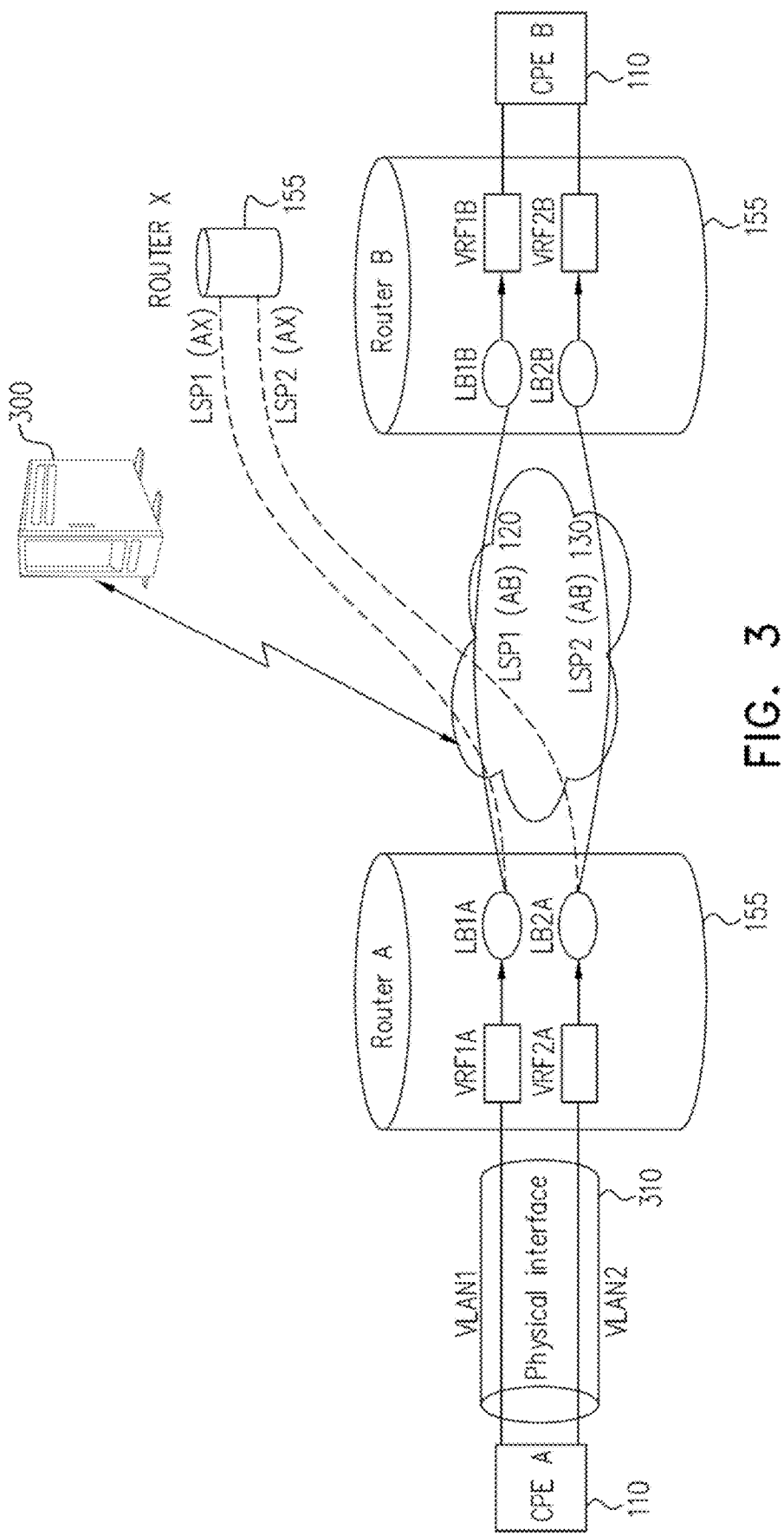
FIG. 3 is a schematic illustration of establishing diverse paths for two VPNs, according to an exemplary embodiment of the disclosure.

FIG. 3 is a schematic illustration of establishing diverse paths (LSP1 120, LSP2 130 (AB, AX)) for two VPN, according to an exemplary embodiment of the disclosure. In an exemplary embodiment of the disclosure, a central controller 300 is used to instruct the service provider edge routers 155 to form diverse paths LSP1 and LSP2. Optionally, one path (e.g. LSP1 (AB) 120) may be formed by default and the second path (e.g. LSP2 (AB)) may be formed to be diverse from the first path. Likewise central controller 300 may reroute paths as needed to maintain or improve diversity.

Alternatively, a distributed approach may be used, for example by relying on the multi-protocol label switching (MPLS) control plane to guarantee LSP diversity and provide it with fiber shared risk link groups (SRLG). In this approach each router ensures diversity of the paths.

In an exemplary embodiment of the disclosure, each VPNx is allocated respective paths LSPx using the following process:

Defining 2 virtual networks (VLAN1, VLAN2) on an interface 310 between the CPE 110 and the service provider edge router (PE) 155 (e.g. router A, B or X);

Defining 2 virtual routers also known as a virtual routing and forwarding instance (VRF) (e.g. VRF1A, VRF2A in router A and VRF1B, VRF2B in router B) in each service provider edge router (PE) 155 (e.g. router A, B or X) connected to the CPE 110;

Defining 2 internal IP addresses (loopback addresses) per each PE 155 (e.g. router A, B or X) (LB1A, LB2A in router A and LB1B, LB2B in router B);

Creating paths LSP1, LSP2 between every pair of service provider edge routers (PE) 155 (e.g. A and B, A and X): LSPx between LBxA in PE A and LBxB in PE B (e.g. LSP1 (AB) between LB1A and LB1B);

Defining each virtual router (VRFx) to connect to a respective loopback address (LBx) as shown in FIG. 3.

In an exemplary embodiment of the disclosure, the CPE 110 actively probes the paths to each remote CPE 110 so that it can balance communication traffic in response to congestion and quality and is not limited to responding to failures.

In the above detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuitry have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms "circuit" and "connection" as used above may be used interchangeably and may refer to a path taken by data traffic in a network from a first endpoint to a second endpoint through any number of network devices and/or gear, such as end-to-end paths connecting customer sites. The data traffic may be unidirectional or bidirectional. On the other hand, the term "circuitry" may refer to electronic circuitry used devices and/or equipment in the network. The term "link" may be used herein to refer to a connection between adjacent elements.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A system for connecting sites of an enterprise organization over a wide area network, comprising:
   customer premises equipment (CPE) at sites of the enterprise organization;
   one or more processors; and
   one or more computer-readable media storing computer-executable instructions that, when executed by the one or more processors, cause the one or more processors to perform operations comprising:
   configuring each CPE to communicate using at least two virtual private networks (VPNs) over a wide area network (WAN) with other CPEs of the enterprise organization;
   causing, at least partly by one or more service provider edge routers, each CPE to be connected to the WAN;
   defining, by each VPN, respective tunnels for routing traffic in an Internet Protocol (IP) layer between the service provider edge routers of any two of the CPEs;
   defining the tunnels such that a physical path between the service provider edge routers in the at least two VPNs are diverse from each other;
   configuring the CPEs to monitor a status of connectivity to the other CPEs by injecting probe packets into the tunnels of the VPNs; and
   selecting, at least partly in response to the status of connectivity, a VPN for transmission of traffic.

2. The system of claim 1, wherein a first physical path is formed by default and a second physical path is formed to be diverse from the first physical path.

3. The system of claim 1, wherein a central controller instructs the service provider edge routers to form diverse paths.

4. The system of claim 1, wherein each service provider edge router is preconfigured to form diverse paths for any two tunnels terminated at both ends by the same service provider edge routers.

5. The system of claim 1, wherein each service provider edge router defines loopback addresses for each VPN and creates a tunnel between respective loopback addresses of pairs of service provider edge routers.

6. The system of claim 5, wherein each service provider edge router defines a virtual router for each VPN, and binds each virtual router with a respective loopback address.

7. The system of claim 1, wherein the CPEs select a VPN for the transmission of traffic based on a response to the injected probe packets.

8. The system of claim 1, wherein the CPEs select a VPN for transmission of traffic based on injected packets from the other CPEs.

9. The system of claim 8, wherein the CPEs select a VPN for transmission of traffic based on serial numbers of the probe packets received from the other CPEs.

10. The system of claim 8, wherein the CPEs select a VPN for transmission of traffic based on timestamps of the probe packets received from other the CPEs.

11. A method for connecting sites of an enterprise organization over a wide area network, comprising:
    Installing customer premises equipment (CPE) at sites of the enterprise organization;
    configuring each CPE to communicate using at least two virtual private networks (VPNs) over a wide area network (WAN) with other CPEs of the enterprise organization;
    connecting each CPE to the WAN by a service provider edge router;
    defining, by each VPN, respective tunnels for routing traffic in an Internet Protocol (IP) layer between the service provider edge routers of any two of the CPEs;
    defining the tunnels such that a physical path between the service provider edge routers in the at least two VPNs are diverse from each other;
    configuring the CPEs to monitor a status of connectivity to the other CPEs by injecting probe packets into the tunnels of the VPNs; and
    selecting, at least partly in response to the status of connectivity, a VPN for transmission of traffic.

12. The method of claim 11, wherein a first physical path is formed by default and a second physical path is formed to be diverse from the first physical path.

13. The method of claim 11, wherein a central controller instructs the service provider edge routers to form diverse paths.

14. The method of claim 11, wherein each service provider edge router is preconfigured to form diverse paths for any two tunnels terminated at both ends by the same service provider edge routers.

15. The method of claim 11, wherein each service provider edge router defines loopback addresses for each VPN and creates a tunnel between respective loopback addresses of pairs of service provider edge routers.

16. The method of claim 15, wherein each service provider edge router defines a virtual router for each VPN, and binds each virtual router with a respective loopback address.

17. The method of claim 11, wherein the CPEs select a VPN for the transmission of traffic based on a response to the injected probe packets.

18. The method of claim 11, wherein the CPEs select a VPN for transmission of traffic based on injected packets from the other CPEs.

19. The method of claim 18, wherein the CPEs select a VPN for transmission of traffic based on timestamps of the probe packets received from the other CPEs.

20. The method of claim 18, wherein the CPEs select a VPN for transmission of traffic based on timestamps of the probe packets received from the other CPEs.

\* \* \* \* \*